(12) United States Patent
Novack et al.

(10) Patent No.: US 8,912,882 B2
(45) Date of Patent: *Dec. 16, 2014

(54) METHODS, SYSTEMS, DEVICES, AND PRODUCTS FOR AUTHENTICATING USERS

(71) Applicant: AT&T Intellectual Property I, L.P., Atlanta, GA (US)

(72) Inventors: Brian M. Novack, St. Louis, MO (US); Daniel L. Madsen, Castro Valley, CA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/737,984

(22) Filed: Jan. 10, 2013

(65) Prior Publication Data

US 2013/0142404 A1 Jun. 6, 2013

Related U.S. Application Data

(63) Continuation of application No. 12/537,949, filed on Aug. 7, 2009, now Pat. No. 8,384,514.

(51) Int. Cl.
| | | |
|---|---|---|
| G05B 19/00 | (2006.01) | |
| G06K 9/00 | (2006.01) | |
| G06F 7/46 | (2006.01) | |
| G06F 21/36 | (2013.01) | |
| G06F 21/32 | (2013.01) | |

(52) U.S. Cl.
CPC ............ *G06K 9/00087* (2013.01); *G06F 21/36* (2013.01); *G06F 21/32* (2013.01)
USPC ....... 340/5.31; 340/5.53; 340/5.81; 340/5.82; 340/5.83; 340/5.52; 382/124

(58) Field of Classification Search
None
See application file for complete search history.

(56) References Cited

U.S. PATENT DOCUMENTS

| | | | |
|---|---|---|---|
| 6,873,713 | B2 | 3/2005 | Okazaki et al. |
| 7,107,220 | B2 | 9/2006 | Novack et al. |
| 7,215,755 | B2 | 5/2007 | Novack |
| 7,254,383 | B2 | 8/2007 | Novack et al. |
| 7,317,792 | B2 | 1/2008 | Novack |
| 7,324,946 | B2 | 1/2008 | Novack |
| 7,356,475 | B2 | 4/2008 | Novack |
| 7,412,081 | B2 | 8/2008 | Doi |
| 7,430,471 | B2 | 9/2008 | Simon |
| 7,436,311 | B2 | 10/2008 | Rapaport et al. |
| 7,526,080 | B2 | 4/2009 | Novack |
| 7,546,454 | B2 | 6/2009 | Novack |
| 7,661,110 | B2 | 2/2010 | Novack |
| 7,765,398 | B2 | 7/2010 | Novack |
| 7,792,270 | B2 | 9/2010 | Novack |

(Continued)

*Primary Examiner* — George Bugg
*Assistant Examiner* — Renee Dorsey
(74) *Attorney, Agent, or Firm* — Scott P. Zimmerman, PLLC

(57) ABSTRACT

Enhanced biometric authentication is achieved by combining a user's inherent biometric data with the user's knowledge of a secret glyph. In one embodiment, a touchpad is provided on which the user may use a finger to indicate a plurality of strokes that form a distinct glyph. Image stabilization may be used to extract a readable fingerprint from the strokes, and the glyph and finger print are matched to a stored profile. The glyph may be one or more alphanumeric characters that represent a password. The user can then enter the password on the touch pad with his finger. If the fingerprint and password both match, the user is authenticated.

20 Claims, 8 Drawing Sheets

(56) References Cited

U.S. PATENT DOCUMENTS

| | | |
|---|---|---|
| 7,868,874 B2 | 1/2011 | Reynolds |
| 7,877,608 B2 | 1/2011 | Novack |
| 7,904,505 B2 | 3/2011 | Rakers |
| 7,916,014 B2 | 3/2011 | Rapaport et al. |
| 7,945,040 B2 | 5/2011 | Novack |
| 2004/0243356 A1 | 12/2004 | Duffy et al. |
| 2004/0264673 A1 | 12/2004 | Novack |
| 2005/0147218 A1 | 7/2005 | Novack |
| 2005/0238214 A1* | 10/2005 | Matsuda et al. ............... 382/124 |
| 2006/0010322 A1 | 1/2006 | Novack |
| 2006/0015729 A1 | 1/2006 | Novack |
| 2006/0034287 A1 | 2/2006 | Novack |
| 2006/0036442 A1 | 2/2006 | Novack |
| 2006/0041507 A1 | 2/2006 | Novack |
| 2006/0080527 A1 | 4/2006 | Novack |
| 2006/0095923 A1 | 5/2006 | Novack |
| 2006/0247933 A1 | 11/2006 | Novack |
| 2006/0271791 A1 | 11/2006 | Novack |
| 2007/0011098 A1 | 1/2007 | Novack |
| 2007/0028091 A1 | 2/2007 | Novack |
| 2007/0097975 A1 | 5/2007 | Rakers et al. |
| 2007/0174116 A1 | 7/2007 | Keith et al. |
| 2007/0177777 A1 | 8/2007 | Funahashi et al. |
| 2007/0189477 A1 | 8/2007 | Novack |
| 2007/0198832 A1 | 8/2007 | Novack |
| 2008/0010122 A1 | 1/2008 | Dunmire et al. |
| 2008/0015859 A1 | 1/2008 | Novack |
| 2008/0016002 A1 | 1/2008 | Beenau et al. |
| 2008/0027730 A1 | 1/2008 | Novack |
| 2008/0049987 A1 | 2/2008 | Champagne et al. |
| 2008/0061927 A1 | 3/2008 | Manton |
| 2008/0071545 A1 | 3/2008 | Novack |
| 2008/0075264 A1 | 3/2008 | Novack |
| 2008/0125166 A1 | 5/2008 | Novack |
| 2008/0298645 A1 | 12/2008 | Doi |
| 2008/0319817 A1 | 12/2008 | Simon |
| 2009/0076966 A1 | 3/2009 | Bishop et al. |
| 2009/0083850 A1 | 3/2009 | Fadell et al. |
| 2009/0108072 A1 | 4/2009 | Wang |
| 2009/0154683 A1 | 6/2009 | Novack |
| 2009/0189736 A1 | 7/2009 | Hayashi |
| 2009/0190737 A1 | 7/2009 | Dunmire et al. |
| 2009/0315864 A1 | 12/2009 | Silverbrook et al. |
| 2010/0075655 A1 | 3/2010 | Howarter et al. |
| 2010/0075656 A1 | 3/2010 | Howarter et al. |
| 2010/0100931 A1 | 4/2010 | Novack |
| 2010/0265038 A1 | 10/2010 | Beenau et al. |
| 2010/0275013 A1 | 10/2010 | Novack |
| 2010/0275267 A1 | 10/2010 | Walker et al. |
| 2010/0322405 A1 | 12/2010 | Novack |
| 2011/0078447 A1 | 3/2011 | Novack |
| 2011/0119138 A1 | 5/2011 | Rakers |
| 2011/0145859 A1 | 6/2011 | Novack |
| 2011/0154452 A1 | 6/2011 | Novack |
| 2011/0234373 A1 | 9/2011 | McBain |

* cited by examiner

METHODS, SYSTEMS, DEVICES, AND PRODUCTS FOR AUTHENTICATING USERS

CROSS-REFERENCE TO RELATED APPLICATION

This application is a continuation of U.S. application Ser. No. 12/537,949, filed Aug. 7, 2009, now issued as U.S. Pat. No. 8,384,514, and incorporated herein by reference in its entirety.

BACKGROUND

1. Field of the Disclosure

The present invention relates to the field of biometric authentication and more particularly to an enhanced device and process for biometric authentication.

2. Description of the Related Art

A concern with any security system is authentication, i.e., granting access to authorized persons and denying access to unauthorized persons. Successful authentication occurs when a system correctly determines that a user is who he claims to be, usually by the user providing at least one self-identifying security token. Many electronic systems will use a person's knowledge, for example of a password, as a security token. Increased security may also be achieved by requiring as a token something in the user's possession, such as a digital certificate. Some security systems will use biometric data, such as fingerprints or retinal scans, as a security token.

DESCRIPTION OF THE EMBODIMENT(S)

Figure 1:
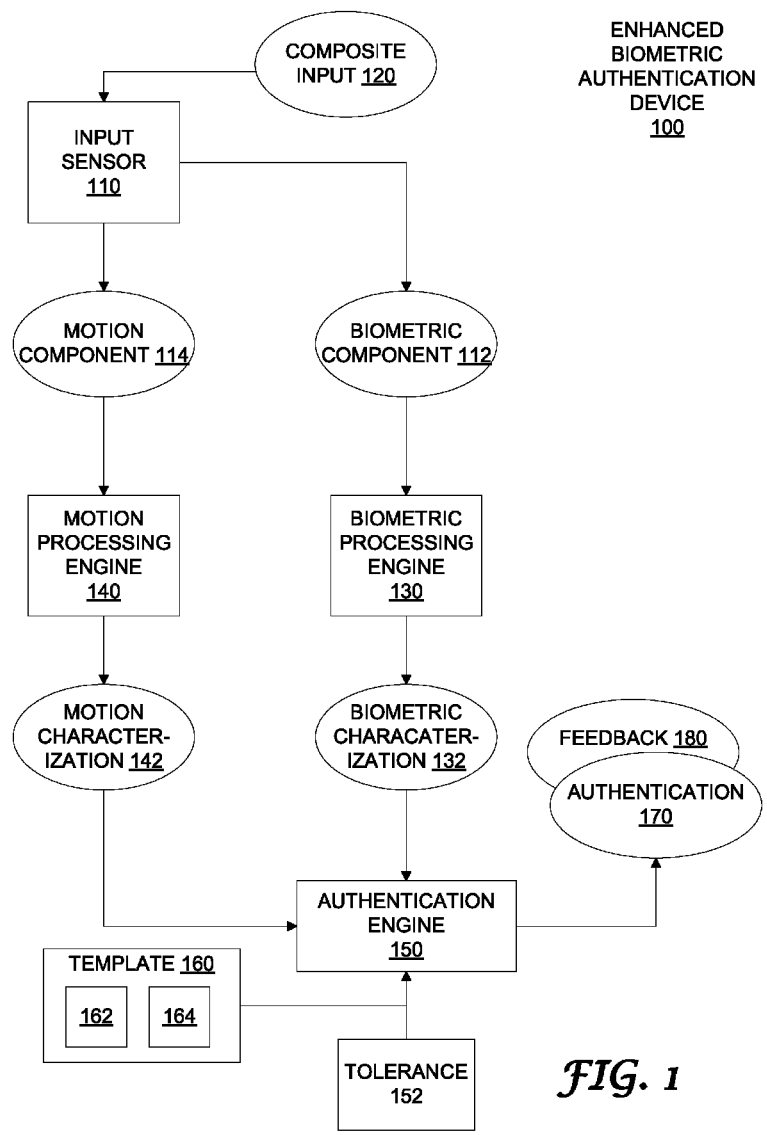
FIG. 1 is a block diagram of selected elements of an exemplary embodiment of an enhanced biometric authentication device.

In one aspect, a disclosed method for achieving enhanced biometric authentication includes combining a user's inherent biometric data with the user's knowledge of a secret pattern. A touchpad may be provided on which the user may use a finger to perform a plurality of strokes that form a distinct pattern. Image stabilization may be used to extract a readable fingerprint from the strokes. The pattern and finger print are matched to a stored profile. A user may train a device to recognize written letters. The user can then enter a password on a touch pad with his finger. If the fingerprint and password both match, the user is authenticated.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

FIG. 1 is a block diagram disclosing an exemplary embodiment of an enhanced biometric authentication device 100 in operation. In FIG. 1, elements of authentication device 100 are shown in rectangular blocks while data that is provided to or processed by authentication device 100 is shown in oval blocks. In the disclosed embodiment, a composite input 120 is provided to an input sensor 110. Composite input 120 includes a biometric component 112 and a mechanical component 114. The biometric component 112 may be one of numerous physiological biometric indicators known in the art, such as finger print, hand print, facial scan, retinal scan, body chemistry, or DNA analysis. To facilitate discussion, the examples in this specification will use a fingerprint as an example, but persons of ordinary skill in the art will recognize, in light of this specification, that other biometric indicators can be adapted to the disclosed devices and techniques. Mechanical component 114 may include any combination of mechanical indicators, such as position, motion, time, direction, velocity, pressure, and acceleration. By way of non-limiting example, composite input 120 could include a finger tracing a glyph, wherein the biometric component 112 comprises a finger print and mechanical component 114 comprises the tracing motion; or composite input 120 could include a person moving his or her eyes, where the biometric component 112 comprises a retinal scan and mechanical component 114 comprises the motion of the eyes. Input sensor 110 is operable to segregate or otherwise distinguish biometric component 112 and mechanical component 114.

Mechanical component 114 is provided to a mechanics processing engine 140, which creates a mechanical characterization 142. Similarly, biometric component 112 is provided to a biometric processing engine 130, which creates a biometric characterization 132. In some embodiments, a characterization is a reduced profile or other type of representation of the raw data contained in the composite input 120. Profile reduction may be accomplished, for example, by a heuristic model or by any of the other numerous methods known in the art for matching biometric data.

The characterizations 132, 142 are provided to an authentication engine 150, which also receives an authentication template 160. An authentication template 160 is a stored characterization profile, containing both a mechanical component 164 and a biometric component 162. Authentication template 160 may be generated in advance of the attempted authentication. There may also be a tolerance 152 associated with authentication template 160. Tolerance 152 may indicate the degree of allowable difference between characterizations 132, 142 and the corresponding components 162, 164.

Authentication engine 150 compares characterizations 132, 142 to components 162, 164 of authentication template 160. If both characterizations match the respective components of authentication template 160 within tolerance 152, the user is authenticated, and an authentication 170 is provided.

In some cases, feedback 180 may also be provided to indicate whether or not the user was successfully authenticated.

Figure 2:
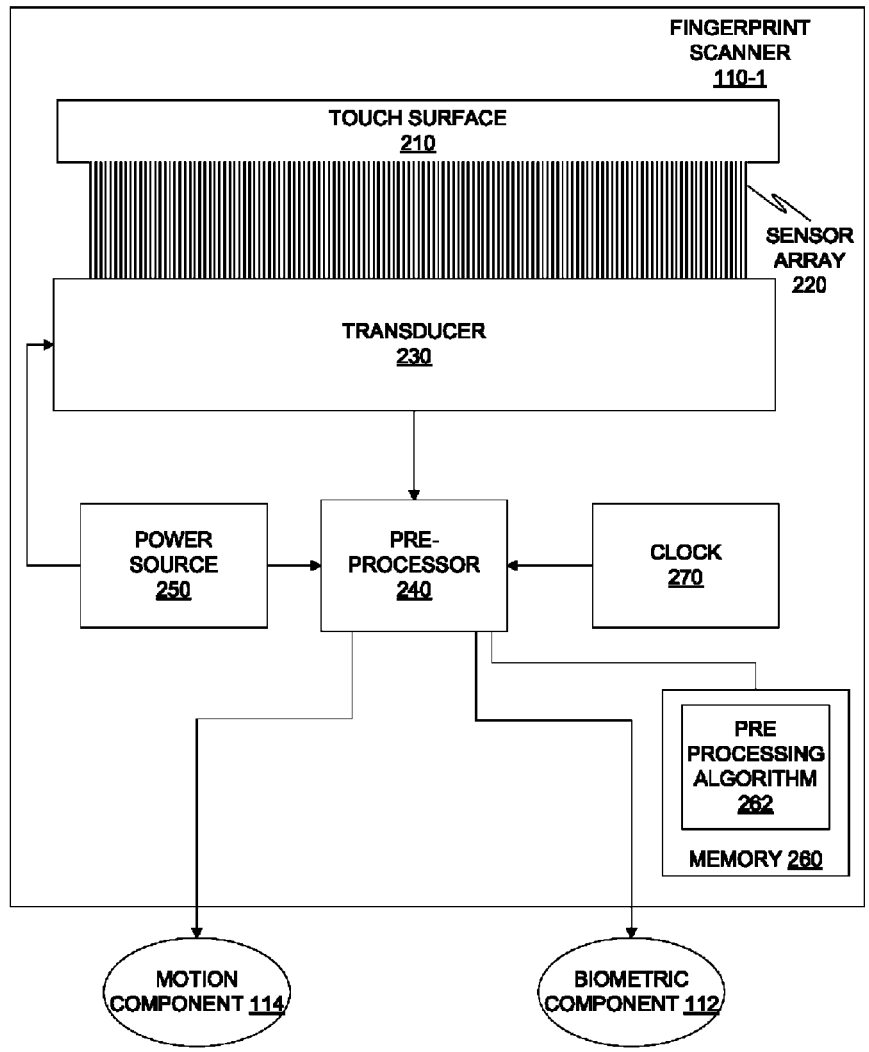
FIG. 2 is a block diagram of selected elements of a fingerprint scanner provided as one exemplary embodiment of an input sensor.

FIG. 2 is a block diagram of selected elements of a fingerprint scanner 110-1 provided as an exemplary implementation of an input sensor 110. Persons of skill in the art will recognize that alternative fingerprint scanners, as well as other biometric input sensors, may be suitable for the same function. In the disclosed embodiment, a touch surface 210 provides an interface for receiving composite input 120. A sensor array 220 reads the fingerprint using a fingerprint scanning technology, several of which are known in the art. For example, optical, capacitive, and ultrasonic type sensors are all known in the art. A transducer 230 digitizes the composite input 120 and provides digital data to a pre-processor 240. Pre-processor 240 is powered by power source 250, which also may provide power to transducer 230 as necessary to implement the fingerprint scanning technology. A clock 270 is also provided to enable pre-processor 240 to handle timing issues related to capturing a mechanical component of composite input 120. Pre-processor 240 processes the digital data to generate mechanical component 114 and biometric component 112. In the depicted embodiment, pre-processor 240 may have access to processor executable instructions that comprise a pre-processing algorithm 262. As depicted in FIG. 2, pre-processing algorithm 262 is stored in a memory 260 that is accessible to pre-processor 240.

Figure 3:
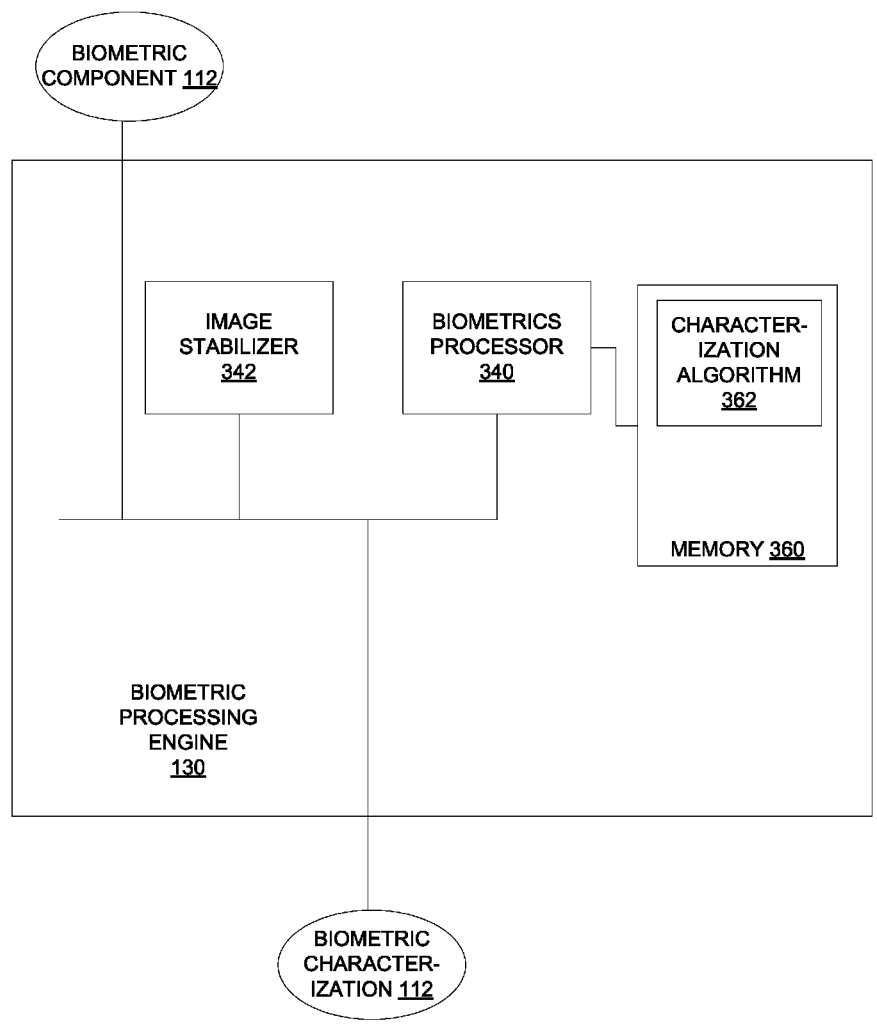
FIG. 3 depicts selected elements of an exemplary embodiment of a biometric processing engine.

FIG. 3 is an exemplary embodiment of a biometric processing engine 130. Biometric processing engine 130 receives biometric component 112 from input sensor 110 (FIG. 1). A biometrics processor 340 is provided to handle the necessary processing. While shown separately, persons having skill in the art will recognize that the disclosure describes functional distinctions, but that biometrics processor 340 may be a single physical device with some or all of pre-processor 240 (FIG. 2), mechanics processor 440 (FIG. 4), and processor 540 (FIG. 5). Biometrics processor 340 is communicatively coupled to memory 360, which also may be a single physical device with any or all of memory 260 (FIG. 2), memory 460 (FIG. 4), memory 560 (FIG. 5). Memory 360 as shown includes instructions that provide a characterization algorithm 362, which provides a method for characterizing biometric component 112. Many such algorithms are known in the art. For example, U.S. Pat. No. 6,963,659 issued to Tumey, et al. on Nov. 8, 2005 discloses a heuristic algorithm for fingerprint matching.

Because composite input 120 includes a mechanical component 114 (FIG. 1), an image stabilizer 342 may be desirable or required to permit biometric processing engine 130 to extract a usable biometric sample. Image stabilizer 342 may employ a technique such as extracting a single frame from a high-frequency composite input sample so as to provide a steady-state image of the biometric component, or a reasonable approximation thereof. Image stabilizer 342 may also provide additional sharpening or other processing as necessary to clean up residual blur or other artifacts created by mechanical inputs. Persons of skill in the art will recognize that, while image stabilizer 342 is shown as part of biometrics processing engine 130, some or all of the functionality could also be provided in input sensor 110 as necessary to suit a particular implementation.

Characterization algorithm 362 creates a biometric characterization 132 of biometric component 112 and provides biometric characterization 132 as an output. In the case of a fingerprint, for example, the biometric characterization 132 generated by characterization algorithm 362 may include data representative of or indicative of the fingerprint. The data may be compliant with a standardized format for representing fingerprints.

Figure 4:
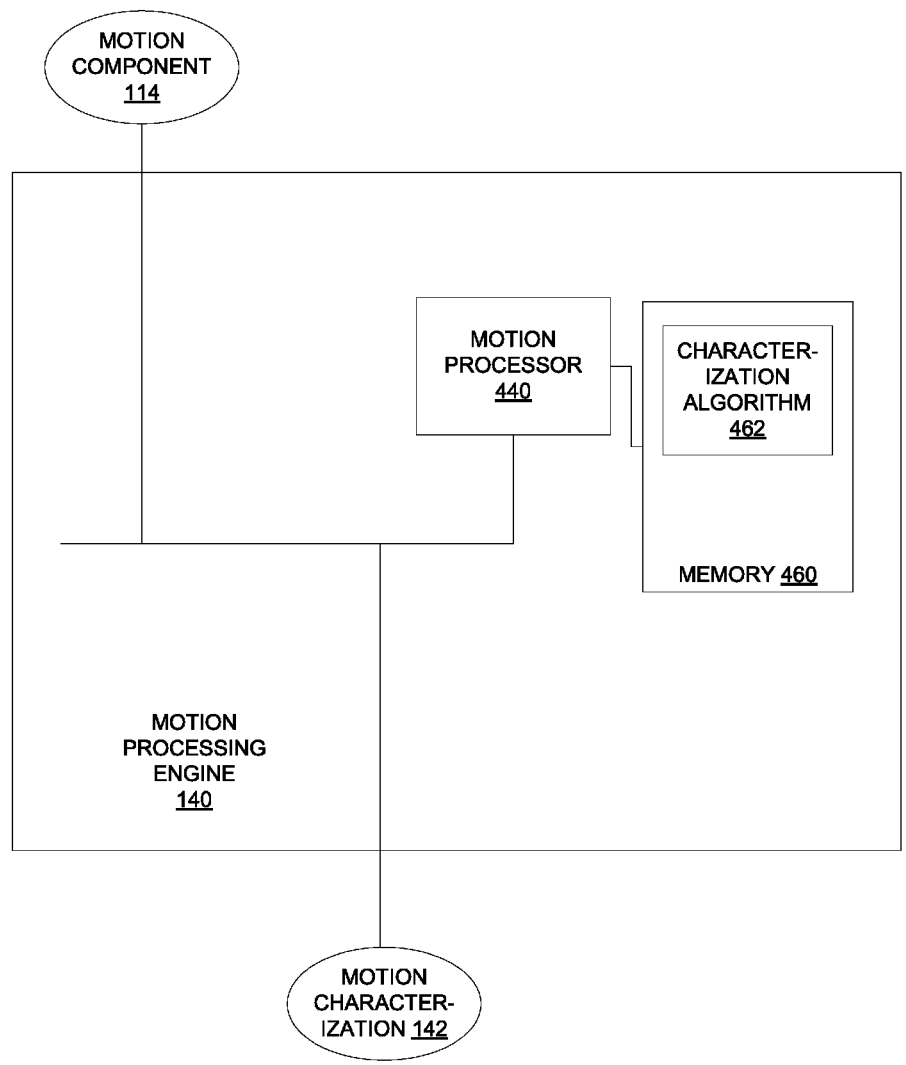
FIG. 4 depicts selected elements of an exemplary embodiment of a mechanics processing engine.
Figure 5:
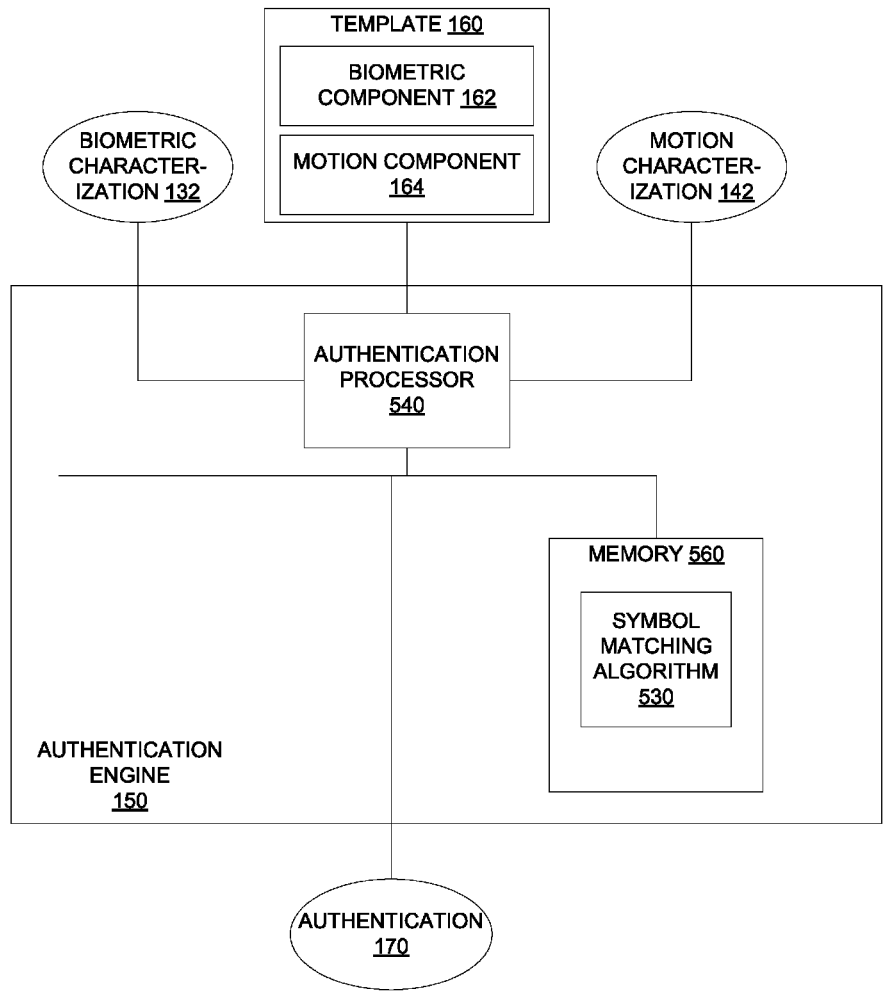
FIG. 5 depicts selected elements of an exemplary embodiment of an authentication engine.
Figure 6:
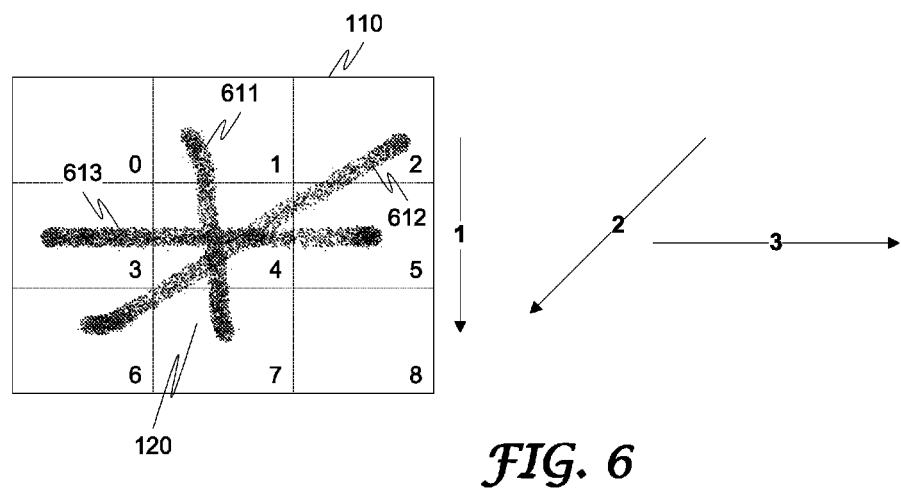
FIG. 6 is a diagram of a fingerprint touch pad disclosing an exemplary composite input sample provided as a security token.

FIG. 4 is a block diagram disclosing an exemplary embodiment of a mechanics processing engine 140. As described above, mechanics processing engine 140 may share some or all of its hardware with biometrics processing engine 130 and authentication engine 150. Mechanics processing engine 140 receives mechanical component 114 as an input. Mechanics processing engine 140 as shown includes mechanics processor 440 connected to memory 460, in which is stored instructions that provide a mechanical characterization algorithm 462. Characterization algorithm 462 may provide any one of numerous possible algorithms, depending on the specific implementation. For example, in some embodiments, mechanical component 114 may describe an arbitrary glyph designated by the user (see, for example, FIG. 6). As used in this specification, a glyph is any symbolic figure or character that conveys information non-verbally. In that case, mechanical component 114 may contain such information as the number of strokes, the order of the strokes, the location of the strokes on the touch pad 110-1, the orientation or direction of the strokes. This information may be conveyed, for example, by indicating the beginning and ending location of each stroke. In some embodiments, touch pad 110-1 may be divided into sectors, as shown in FIG. 6, and location information may include information such as the sector in which the stroke was begun, sectors the stroke traversed in which order, and the sector in which the stroke ended. Mechanics processor 440 invokes characterization algorithm 462 to generate a mechanical characterization 142, which is an output of mechanics processing engine 140.

FIG. 5 is a block diagram of an exemplary embodiment of an authentication engine 150, which as described above may share some or all of its hardware with input sensor 110, mechanics processing engine 140, and/or biometric processing engine 130. Authentication engine 150 receives biometric characterization 132 and mechanical characterization 142. An authentication template 160 may be stored in non-volatile storage and also provided to authentication engine 150. An authentication processor 540 is connected to a memory 560. Memory 560 includes instructions that provide a glyph matching algorithm 530. Glyph matching algorithm 530 compares biometric characterization 132 and mechanical characterization 142 to authentication template 160 which includes a biometric component 162 and a mechanical component 164. For glyph matching algorithm 530 to indicate a good match, both biometric characterization 132 and mechanical characterization 142 must match data in authentication template 160. If glyph matching algorithm 530 indicates a match, then authentication processor 540 generates authentication 170.

FIG. 6 is a diagram of a fingerprint touch pad 110 indicating an exemplary composite input 120 provided as a security token. In this example, the composite input 120 includes a three-stroke glyph drawn by the user's index finger. The first stroke 611 is drawn by starting in sector 1 and, in a substantially straight downward motion, traversing sector 4 and ending in sector 7. The second stroke 612 is drawn starting in sector 2, traversing sector 4 in a downward and left diagonal motion, and ending in sector 6. The third stroke 613 is made by starting in sector 3, traversing sector 4 in a rightward horizontal motion, and ending in sector 5. In this example, the foregoing data are stored in an authentication template 160 along with a sample of the user's fingerprint during a template creation process or procedure. When a user later attempts to authenticate, biometric processing engine 130 will take one or more samples of the user's fingerprint from touch pad 110 and authentication engine 150 will determine whether there is a match with the fingerprint data in authentication template 160. Mechanics processing engine 140 may provide data about the order and shape of the strokes, including information such as the starting sector, ending sector, sectors traversed, and general direction. Authentication engine 150 may determine whether these data match mechanical data in the authentication template 160. If both the fingerprint and the mechanical data match biometric component 162 and mechanical component 164 in the authentication template 160, the user may be authenticated.

Figure 7:
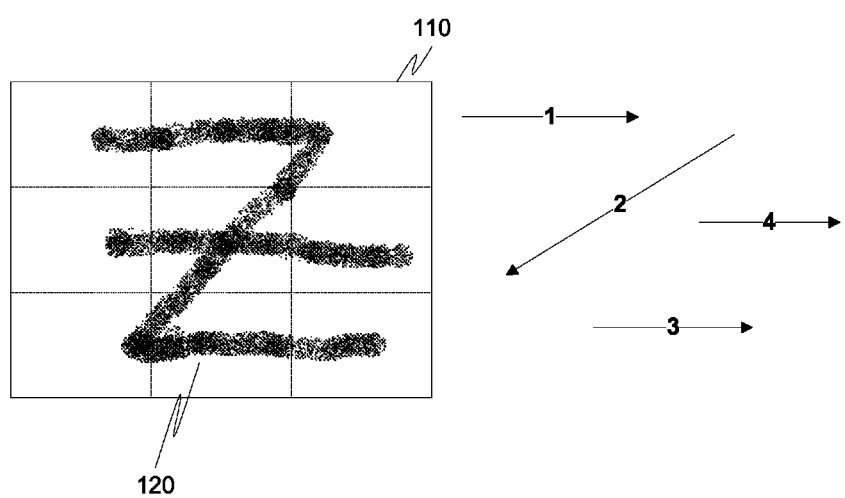
FIG. 7 is a diagram of a fingerprint touchpad providing a second exemplary security token input sample.

FIG. 7 illustrates a second example of providing authentication via a touch pad 110. In FIG. 7, the user traces a glyph that looks substantially like a letter "Z." Authentication template 160 could store stroke data such as in FIG. 6, in which case the order and shape of the strokes may need to be matched to provide authentication. But as an alternative, mechanics processing engine 140 characterization algorithm 462 may include a handwriting recognition component that recognizes alphanumeric characters and, optionally, user specific characteristics of one or more alphanumeric characters. In that case, mechanics processing engine 140 may only provide, for example, the ASCII code for the letter "Z," and possibly additional data representing user specific characteristics of the input. Authentication template 160 would likewise contain only the ASCII code for the letter "Z" in its mechanical data and possibly a user specific data if needed. This method may simplify authentication for the user. Rather than having to remember the specific strokes, including starting and ending sectors, the user would only need to remember a letter. On the other hand, this method may be less secure than the method of FIG. 6, as alphanumeric characters comprise a relatively small, bounded set.

In one embodiment, a user trains biometric authentication device 100 with sample inputs of a plurality of glyphs. Authentication may then comprise a step of presenting the user with one or more randomly-selected glyphs and receiving a composite input 120 corresponding to each glyph. Advantageously, this may pose difficulties for a non-authentic user, because he cannot learn a password as part of composite input 120.

Figure 8:
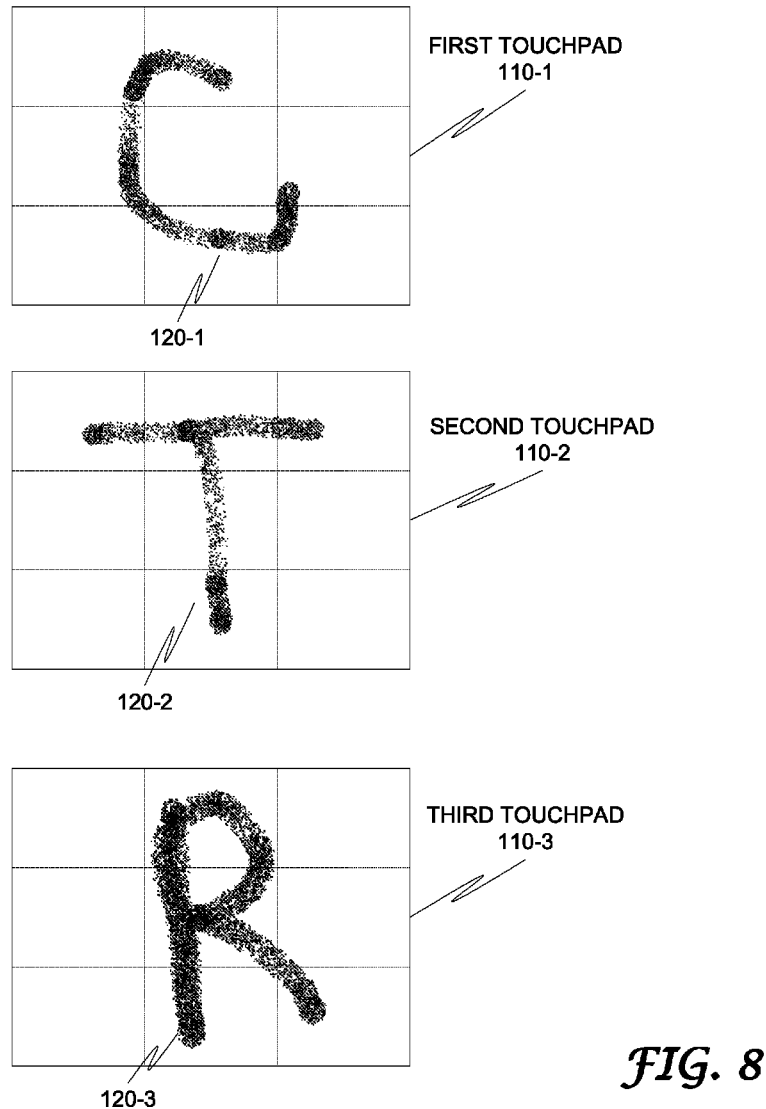
FIG. 8 is a diagram of a plurality of fingerprint touch pads, disclosing a third exemplary security token input sample.

FIG. 8 is a diagram of a plurality of fingerprint touch pads 110, which may provide additional security over the method of FIG. 7. In this example, three touch pads 110-1, 110-2, and 110-3 are provided. The user may choose a random three-character alphanumeric string such as "CTR" for authentication. In this case, "C" input 120-1 is entered on first touch pad 110-1, "T" input 120-2 is entered on second touch pad 120-2, and "R" input 120-3 is entered on third touch pad 110-3. The user is authenticated only if those three letters are entered on those pads in that order. To further enhance security, users may be required to use the pads in a non-sequential order. For example, instead of entering the letters in the order "C" "T" "R," the user may enter the letters on the touch pads as disclosed, but in the order "T" "C" "R." This provides the additional security measure of requiring the user to know not only the letters to be entered on each pad, but the order in which the letters are to be entered.

Figure 9A:
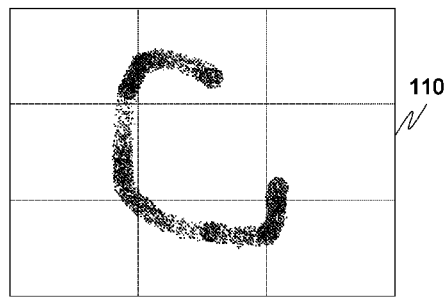
FIGS. 9A, 9B, and 9C are diagrams of a single fingerprint touch pad used to enter a string of alphanumeric characters in sequence.
Figure 9C:
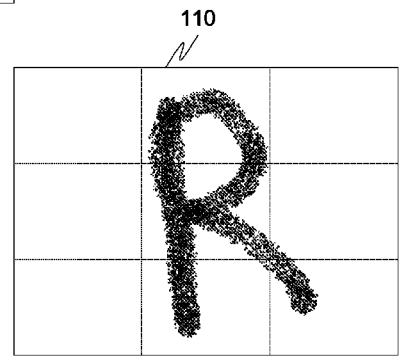
Figure 9B:
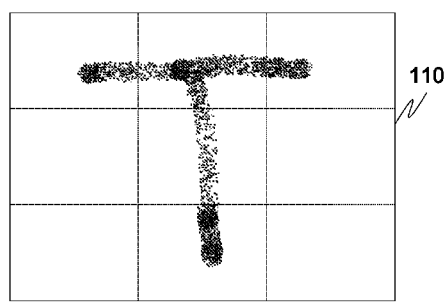

FIGS. 9A, 9B, and 9C are diagrams of a single fingerprint touch pad 110 used to enter a string of alphanumeric characters. In this case, the user chooses the pass phrase "C" "T" "R" as before. Rather than entering the letters on three separate touch pads, the user enters the letters sequentially on a single touch pad 110. This method provides the added benefit of allowing a pass phrase of arbitrary length and reduces hardware costs by employing just a single touchpad 110. For example, rather than the short phrase "CTR," the user may choose as his pass phrase a longer random string, including non-alphanumeric characters, such as "PTu7%5x". This method provides the ability to use the same type of pass phrase that is commonly used in the art, but with the added security measure that the pass phrase must be entered with a finger matching the fingerprint stored in authentication template 160. Another advantage to the use of pass phrases is that hashing algorithms may be employed so that authentication template 160 need not store mechanical data in a format that would be accessible if authentication template 160 itself were compromised. For example, if authentication template 160 contained the string "PTu7%5x," a malicious user who gains access to authentication template 160 would learn the pass phrase portion of authentication template 160. Not only would this weaken the security of enhanced biometric authentication device 100, but it may also weaken security for other systems, as many users re-use their passwords on multiple systems. But if authentication template 160 stores only a hash of the pass phrase, then a malicious user would not learn any useful data, even if he gained access to authentication template 160. Another potential solution is to store mechanical component 164 of template 160 in a machine-usable form, and then to use biometric characterization 132 as an encryption key to encrypt mechanical component 164. Thus, mechanical component 164 can only be decrypted for use with a correct biometric characterization.

In one exemplary application of the method of FIG. 9, a laptop or desktop computer could include a mouse pad that also includes fingerprint-sensing technology. When the user logs in, he will "write" his pass phrase, one character at a time, on the mouse pad. The user will be authenticated only if both the pass phrase and the user's fingerprint match, as determined by a finger print matching algorithm and a hash function performed on the pass phrase.

To the maximum extent allowed by law, the scope of the present disclosure is to be determined by the broadest permissible interpretation of the following claims and their equivalents, and shall not be restricted or limited to the specific embodiments described in the foregoing detailed description.

The invention claimed is:

1. A system, comprising:
a processor; and
a memory storing code that when executed causes the processor to perform operations, the operations comprising:
receiving a composite input comprising an image of a fingerprint extracted from a stroke of an arbitrary glyph drawn by a user on a touch surface;
generating a mechanical characterization of the arbitrary glyph drawn by the user;
segregating the composite input into the image of the fingerprint and into the mechanical characterization of the arbitrary glyph;
comparing the image of the fingerprint to a template for authentication;
comparing the mechanical characterization to the template for authentication; and
authenticating the user when both the image of the fingerprint and the mechanical characterization match the template for authentication.

2. The system according to claim 1, wherein the operations further comprise sectorizing the arbitrary glyph drawn by the user.

3. The system according to claim 2, wherein the operations further comprise determining the arbitrary glyph drawn by the user matches a starting sector defined in the template for authentication.

4. The system according to claim 2, wherein the operations further comprise determining the arbitrary glyph drawn by the user matches an ending sector defined in the template for authentication.

5. The system according to claim 1, wherein the operations further comprise applying a tolerance to the template for authentication.

6. The system according to claim 1, wherein the operations further comprise receiving multiple arbitrary glyphs drawn by the user on the touch surface.

7. The system according to claim 6, wherein the operations further comprise determining the multiple arbitrary glyphs match a sequence of glyphs in the template for authentication.

8. A method, comprising:
- receiving, by a processor, a composite input comprising an image of a fingerprint extracted from a stroke of an arbitrary glyph drawn by a finger of a user on a touch surface of a device;
- generating, by the processor, a mechanical characterization of the arbitrary glyph drawn by the finger of the user;
- segregating, by the processor, the composite input into the image of the fingerprint and the mechanical characterization of the arbitrary glyph;
- comparing, by the processor, the image of the fingerprint to a template for authentication;
- comparing, by the processor, the mechanical characterization to the template for authentication; and
- authenticating, by the processor, the user in response to a match of both the image of the fingerprint and the mechanical characterization to the template for authentication.

9. The method according to claim 8, further comprising sectorizing the arbitrary glyph drawn by the user.

10. The method according to claim 9, further comprising determining the arbitrary glyph drawn by the user matches a starting sector defined in the template for authentication.

11. The method according to claim 9, further comprising determining the arbitrary glyph drawn by the user matches an ending sector defined in the template for authentication.

12. The method according to claim 8, further comprising applying a tolerance to the template for authentication.

13. The method according to claim 8, further comprising receiving multiple arbitrary glyphs drawn by the user on the touch surface.

14. The method according to claim 13, further comprising determining the match between the multiple arbitrary glyphs and a sequence of glyphs in the template for authentication.

15. A memory storing instructions that when executed cause a processor to perform operations, the operations comprising:
- receiving a composite input comprising an image of a fingerprint extracted from a stroke of an arbitrary glyph drawn by a finger of a user on a touch surface;
- generating a mechanical characterization of the arbitrary glyph drawn by the finger of the user;
- segregating the composite input into the image of the fingerprint and the mechanical characterization of the arbitrary glyph;
- comparing the image of the fingerprint to a template for authentication;
- comparing the mechanical characterization to the template for authentication; and
- authenticating the user in response to a match of both the image of the fingerprint and the mechanical characterization to the template for authentication.

16. The memory according to claim 15, wherein the operations further comprise sectorizing the arbitrary glyph drawn by the user.

17. The memory according to claim 16, wherein the operations further comprise determining the arbitrary glyph drawn by the user matches a starting sector defined in the template for authentication.

18. The memory according to claim 16, wherein the operations further comprise determining the arbitrary glyph drawn by the user matches an ending sector defined in the template for authentication.

19. The memory according to claim 15, wherein the operations further comprise applying a tolerance to the template for authentication.

20. The memory according to claim 15, wherein the operations further comprise:
- receiving multiple arbitrary glyphs drawn by the user on the touch surface; and
- determining the multiple arbitrary glyphs match a sequence of glyphs in the template for authentication.

* * * * *